(12) United States Patent
Kalman et al.

(10) Patent No.: US 9,348,713 B2
(45) Date of Patent: May 24, 2016

(54) TECHNIQUES FOR IMPORTATION OF INFORMATION TO A STORAGE SYSTEM

(71) Applicant: NetApp, Inc., Sunnyvale, CA (US)

(72) Inventors: Dean Kalman, Cary, NC (US); Vishwas Venkatesh Pai, Bangalore (IN); Baskaran Krishnamurthi, Bangalore (IN); Santosh Rao, Sunnyvale, CA (US); Chandramouli Subramanian, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 140 days.

(21) Appl. No.: 14/191,747

(22) Filed: Feb. 27, 2014

(65) Prior Publication Data

US 2015/0169411 A1 Jun. 18, 2015

Related U.S. Application Data

(60) Provisional application No. 61/916,095, filed on Dec. 13, 2013.

(51) Int. Cl.
*G06F 11/00* (2006.01)
*G06F 11/20* (2006.01)

(52) U.S. Cl.
CPC ............ *G06F 11/2092* (2013.01); *G06F 11/20* (2013.01); *G06F 11/2023* (2013.01); *G06F 11/2028* (2013.01); *G06F 11/2069* (2013.01)

(58) Field of Classification Search
CPC . G06F 11/2023; G06F 11/20; G06F 11/2028; G06F 11/203; G06F 11/2033; G06F 11/2069
See application file for complete search history.

(56) References Cited

U.S. PATENT DOCUMENTS

| | | | |
|---|---|---|---|
| 2004/0158777 A1* | 8/2004 | Bae | H04L 1/22 714/47.3 |
| 2005/0154937 A1* | 7/2005 | Achiwa | G06F 11/2023 714/6.3 |
| 2007/0234115 A1* | 10/2007 | Saika | G06F 11/203 714/13 |
| 2011/0078490 A1* | 3/2011 | He | H04L 41/0668 714/4.11 |
| 2014/0047263 A1* | 2/2014 | Coatney | G06F 11/2023 714/4.11 |

* cited by examiner

*Primary Examiner* — Charles Ehne
(74) *Attorney, Agent, or Firm* — Kilpatrick Townsend & Stockton LLP

(57) ABSTRACT

Various embodiments are generally directed an apparatus and method for receiving an event notification for a pair of cluster nodes having a first cluster node and a second cluster node, the event notification indicating an occurrence of a takeover event or a giveback event. Further, various embodiments may include suspending copying of information from a source logical unit to a target logical unit, transferring one or more processes from the first cluster node to the second cluster node and resuming importation of information from the source logical unit to the target logical unit.

24 Claims, 13 Drawing Sheets

800

RECEIVE AN EVENT NOTIFICATION FOR A PAIR OF CLUSTER NODES HAVING A FIRST CLUSTER NODE AND A SECOND CLUSTER NODE, THE EVENT NOTIFICATION INDICATING AN OCCURRENCE OF A TAKEOVER EVENT OR A GIVEBACK EVENT
805

SUSPEND COPYING OF INFORMATION FROM A SOURCE LOGICAL UNIT TO A TARGET LOGICAL UNIT
810

TRANSFER ONE OR MORE PROCESSES FROM THE FIRST CLUSTER NODE TO THE SECOND CLUSTER NODE
815

RESUME IMPORTATION OF INFORMATION FROM THE SOURCE LOGICAL UNIT TO THE TARGET LOGICAL UNIT
820

*FIG. 8*

TECHNIQUES FOR IMPORTATION OF INFORMATION TO A STORAGE SYSTEM

The present application claims the benefit of earlier filed Provisional U.S. Pat. App. No. 61/916,095, filed on Dec. 13, 2013, which is incorporated by reference herein in its entirety.

BACKGROUND

Data migration is the process of copying data or information from an existing storage device to a new storage device. Migrating storage area network (SAN) based data to different storage systems is an ongoing challenge. For example, moving information using backup and restore from a tape device is slow and cumbersome and does not scale well. The result is that data migration projects tend to be time consuming and costly, requiring extensive application downtime.

Many factors drive the need to migrate information from one storage system to another storage system. For example, storage systems may need to be upgraded for better performance and capacity or replaced when they come off lease. Applications may need to move from test and development storage systems to production storage systems. Disk distributions, Redundant Array of Independent Disks (RAID) groups, and so on are reorganized periodically as performance or protection needs change over time. Thus, data migration is not a one-time challenge, but a recurring effort that consumes time, resources, and budgets.

BRIEF DESCRIPTION OF THE DRAWINGS

FIG. 8 illustrates a second exemplary embodiment of a logic flow.

DETAILED DESCRIPTION

Figure 1A:
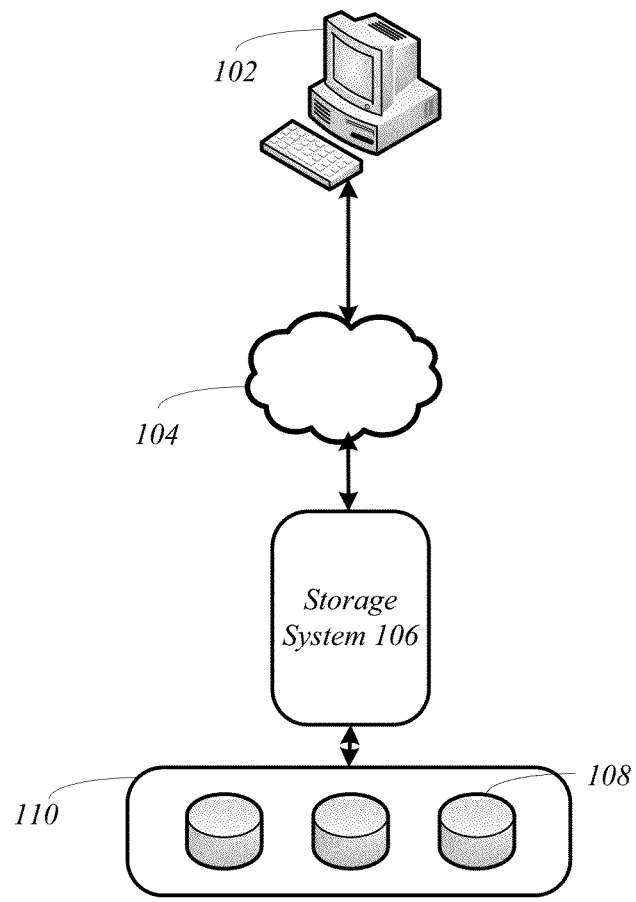
FIG. 1A illustrates an exemplary embodiment of a system overview of a storage computing system.

As previously discussed, current data migration from one storage system (source storage system) to another storage system (target storage system) is time consuming, costly and an ongoing challenge. Thus, various embodiments are generally directed towards data migration from source storage system to a target storage system and handling faults, failures, mobility events, takeover and giveback events, and the like during data migration.

In various embodiments, the source storage system and the target storage system may each have one or more storage devices and store information as a logical unit, e.g., a source logical unit and a target logical unit. Further, each of the storage systems may include one or more cluster nodes or controllers coupled with the storage devices to form the storage system. In various embodiments, the cluster nodes may be separate computing devices and or controllers for processing read/write requests for the storage system.

The target storage system may be introduced into a preexisting storage system environment, such as a storage area network (SAN) environment including the source storage system. The importation of information from the source storage system and source logical unit to the target storage system and target logical unit may be initialized. More specifically, the target logical unit may bind with the source logical unit through one or more cluster nodes and information may be copied from the source logical unit to the target logical unit on a block-by-block basis.

Some embodiments are directed to handling read and write requests from a host device during the importation of information. As will become apparent in the follow description, read requests may be handled by the target storage system and serviced by the source logical unit. More specifically, the target storage system may process the read request from the host device and read information from the source logical unit based on the read request. Further, write requests from the host device may also be handled by the target storage system and serviced by the source logical unit and the target logical unit. More specifically, the target storage system may process write requests by writing information to the source logical unit and the target logical unit based on the write request. By processing the read and write requests from a host device, the importation of information may be seamless and transparent to the host device. Moreover, a limited amount of downtime to access information by the host device may be experienced during the importation of information.

Some embodiments may also be directed to handling failure, takeover and giveback events experienced by a storage system. As previously discussed, the storage systems may include one or more cluster nodes. For example, the target storage system may include four cluster nodes where each cluster node is paired with another cluster node to form two paired cluster nodes. As will be discussed in more detail below, the paired cluster nodes may form a high availability cluster node system such that if one cluster node fails it's paired cluster node can takeover processing from the failed cluster node. Further, a cluster node may giveback processing to its paired cluster node when it comes back online.

During a failure, takeover or giveback event, one or more modules or components of the storage system may handle the event such that the failure is transparent to a host device and the importation of data does not have to restart from the beginning. For example, when a cluster node fails, the importation processing may stop or be suspended until the paired cluster node assumes reasonability of the processes on the failed cluster node. In addition, any logical units associated with failed cluster node may be associated with the new cluster node, processes executing on the failed cluster node may be initialized and operate on the paired cluster node and configuration information may be updated in memory or a data store. More specifically, configuration or identification information may be updated such that host device read/write requests are sent to the correct cluster node, the paired cluster node is identified as the current cluster node handling the importation processing and the location of the logical units associated with the paired cluster node is updated.

Once the paired cluster node has taken over processing and the configuration information is updated, the importation of information may be restarted. In some embodiments, a checkpoint may be saved in the target logical unit after a region of information is copied from the source logical unit to the target logical unit. Thus, in the case of a failure, takeover or giveback event, the importation process may restart from the last checkpoint saved in the target logical unit. These and other details will become more apparent in the following description.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure described here is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

FIG. 1 illustrates a general overview of an exemplary computing system 100 including a host device 102, network 104 having one or more interconnects, a storage system 106 and a storage array 110 having one or more storage devices 108. In various embodiments, computing system 100 may be a clustered storage system in a storage area network (SAN) environment. For example and as will be discussed in more detail with respect to FIGS. 2, 4A, 4B and 5A-5C, storage system 106 may include any number of cluster nodes.

Host device 102 may be any type of computing system configured to execute one or more applications. Moreover, the host device 102 may interact with the storage system 106 in accordance with a client/server model of information delivery. That is, the host device 102 may request the services of the storage system 106, and the system may return the results of the services requested by the host, by exchanging packets over the network 104. The host device 102 may communicate packets utilizing file-based access protocols, such as the Common Internet File System (CIFS) protocol or Network File System (NFS) protocol, over TCP/IP when accessing information in the form of files and directories. In addition, the host device 102 may communicate packets utilizing block-based access protocols, such as the Small Computer Systems Interface (SCSI) protocol encapsulated over TCP (iSCSI) and SCSI encapsulated over Fibre Channel (FCP), when accessing information in the form of blocks.

In various embodiments, network 104 may include a point-to-point connection or a shared medium, such as a local area network. In the same or other embodiments, network 104 may include any number of devices and interconnects such that host 102 may communicate with storage system 106. Illustratively, the computer network 104 may be embodied as an Ethernet network, Fibre Channel (FC) network or any other type of medium to communicate messages or information. The host 102 may communicate with the storage system 106 over the network 104 by exchanging discrete frames or packets of data according to pre-defined protocols, such as the Transmission Control Protocol/Internet Protocol (TCP/IP), as previously discussed.

Storage system 106 may be one or more computers or cluster nodes that provide storage services relating to the organization of information on storage devices, such as storage devices 108. As will be discussed in more detail below, storage system 106 may include any number of cluster nodes having elements and components to provide storage services to host 102 and other storage systems. More specifically, storage system 106 may include a number of elements, components and modules to implement a high-level module, such as a file system, to logically organize the information as a hierarchical structure of directories, files and special types of files called virtual disks (vdisks) or logical units identified by a logic unit number (LUN) on the storages devices 108.

In some embodiments, storages devices 108 may include hard disk drives (HDD) and direct access storage devices (DASD). In the same or alternative embodiments, the storage devices 108 may include electronic media, e.g., Flash memory, etc. As such, the illustrative description of writeable storage device media comprising magnetic media should be taken as exemplary only.

Storage of information on storage array 110 may be implemented as one or more storage "volumes" that include a collection of storage devices 108 cooperating to define an overall logical arrangement of volume block number (vbn) space on the volume(s). The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

In some embodiments, the information on storage array 110 may be exported or sent to host 102 as one or more data structures such as a logical unit identified by logical unit numbers (LUNs). The LUN may be unique identifier used to designate individual or collections of hard disk devices for address by a protocol associated with a SCSI, iSCSI, Fibre Channel (FC), and so forth. Logical units are central to the management of block storage arrays shared over a storage area network (SAN). Each LUN identifies a specific logical unit, which may be a part of a hard disk drive, an entire hard disk or several hard disks in a storage device, for example. As such, a LUN could reference an entire RAID set, a single disk or partition, or multiple hard disks or partitions. The logical unit is treated as if it is a single device and is identified by the LUN.

In some embodiments, the logical unit may be made up of a number of a logical blocks identified by logical block addresses. The logical blocks may be of a particular size, such as 64 kilobytes (KB) or any other size. Furthermore, each logical block address identifies one logical block of the particular size.

Figure 1B:
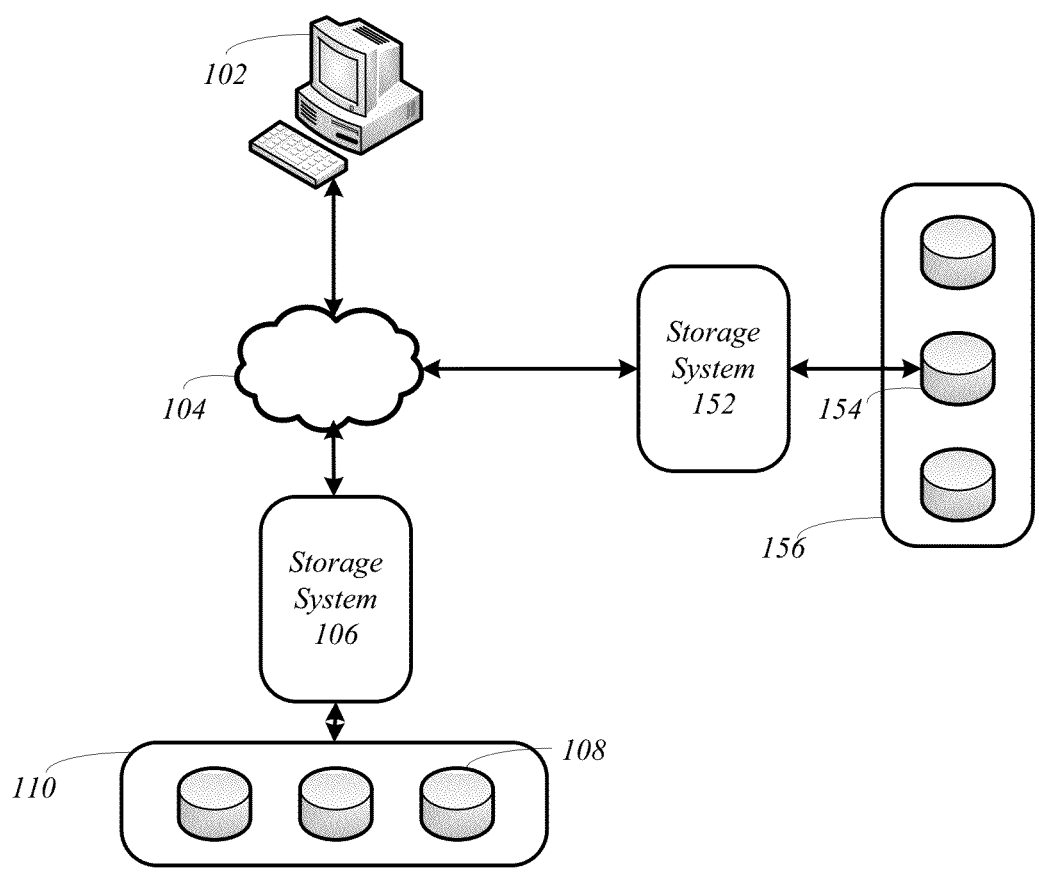
FIG. 1B illustrates a second exemplary embodiment of a system overview of a storage computing system.

FIG. 1B illustrates a second illustrative embodiment of a computing system 150 having an additional storage system 152 and storage array 156 having one or more storage devices 154. In various embodiments, storage system 152 may communicate with host 102 and storage system 106 via network 104 over one or more interconnects, as previously discussed above. In some embodiments, storage system 152 may be the same as or similar to storage system 106 and storage array 156 having storage devices 154 may be the same as or similar as storage array 110 and storage devices 108.

In various embodiments, storage system 152 and storage array 156 may be introduced into the SAN environment and information from storage system 106 and storage array 108 may be imported to storage system 152 and storage array 156. As will become more apparent with the following description, information stored in storage array 110 may be seamlessly imported, copied or moved to storage array 156. Moreover, the importing, copying or moving of the information may be transparent to the host device 102. In addition, once the information is imported from storage system 108 and storage array 110 to storage system 152 and storage array 156, storage system 108 and storage array 110 may be transparently removed from the computing system without the host device's 102 knowledge.

Figure 2:
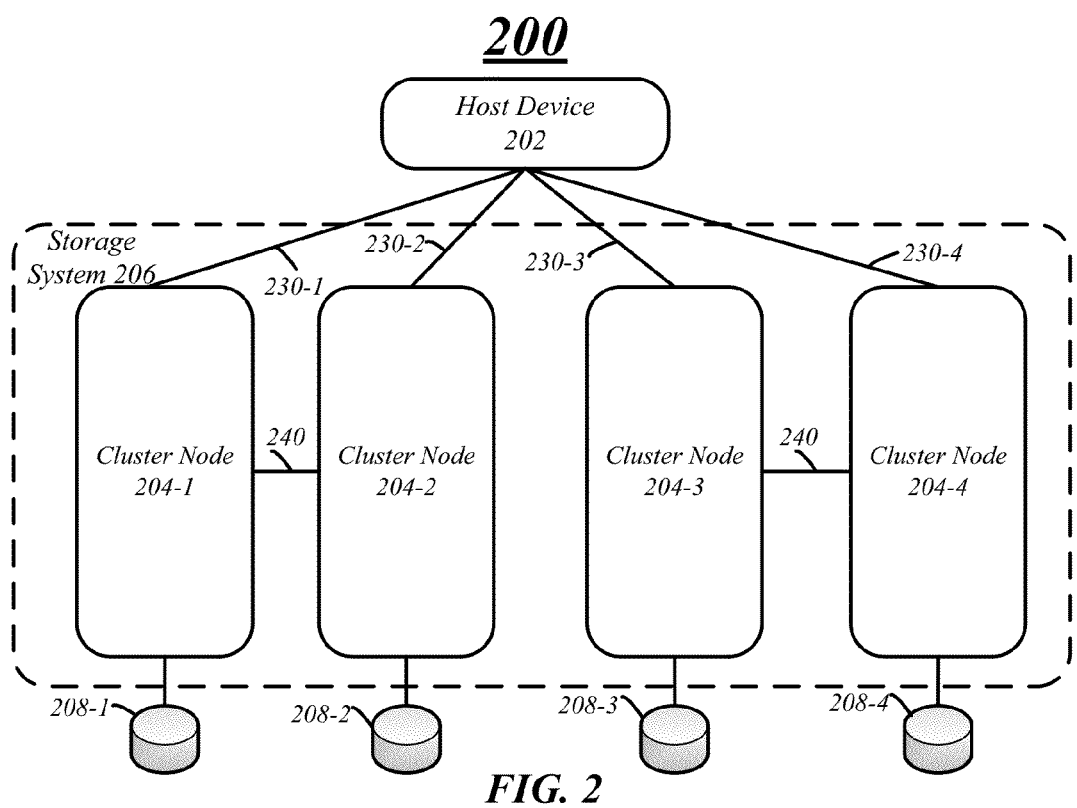
FIG. 2 illustrates a third embodiment of a storage computing system having cluster nodes.

FIG. 2 illustrates an embodiment of a computing system 200 including a host device 202 connected or coupled with a storage system 206 in a storage area network (SAN) environment. In various embodiments, the storage system 206 may be similar to or the same as storage systems 106 and 152. FIG. 2 illustrates storage system 206 including cluster nodes 204-1 through 204-4 coupled with storage devices 208-1 through 208-4.

Cluster nodes 204-1 through 204-4 may be any computing device including a processor, processing circuitry, a controller, a storage controller, and so forth. Storage devices 208-1 through 208-4 may be the similar or the same as storages devices 108 and 154. Although FIG. 2 only illustrates four cluster nodes and four storage devices, various embodiments may include any number of cluster nodes and storages devices. Further, each cluster node may be coupled with more than one storage device such as in a storage array configuration similar to storage arrays 110 and 156.

The storage system 206 can make some or all of the storage space on the mass storage devices 208 available to the host device 202. For example, the host device 202 can access a cluster node 204 of the storage system 206 using well known protocols, such as Internet Small Computer System Interface (iSCSI), Fibre Channel Protocol (FCP), or Fibre Channel over Ethernet (FCoE). The cluster node 204 can present or export data stored on the mass storage devices 208 as logical units (LUNs), for example, to the host device 202 via interconnects 230-1 through 230-4. In some embodiments, a cluster node 204 can communicate with each other cluster node 204 over the cluster interconnect (not shown), which can be implement, for example, as a Gigabit Ethernet switch.

In embodiments, the cluster nodes 204 may be configured as high availability pairs. More specifically, cluster nodes 204-1 and 204-2 may be paired as high availability pairs and cluster nodes 204-3 and 204-4 are paired as high availability pairs. The high availability pairs provide a redundant failover capability for the storage system 206. In various embodiments, each of the cluster nodes 204-1 through 204-4 may serve information independently of its paired node during normal operation. However, in the event of individual cluster node 204 failures, one or more processes for processing data may transfer from the failing or failed cluster node to the surviving paired cluster node. The high availability pair configuration may protect against hardware failures, including the failure of network interface cards, and shelf input/output modules.

In the high availability pair cluster node environment, each node may monitor the availability status of its partner by means of a heartbeat signal that may be transmitted between the cluster nodes 204 through the interconnects 240. In various embodiments, the failure to receive a heartbeat signal over interconnects 240 may indicate the paired cluster node 204 has failed and trigger a failover or takeover event. In addition to the heartbeat signal, other information may be communicated between the paired cluster nodes 204 such as, system time, and details concerning temporary disk unavailability due to pending disk firmware updates.

Figure 3:
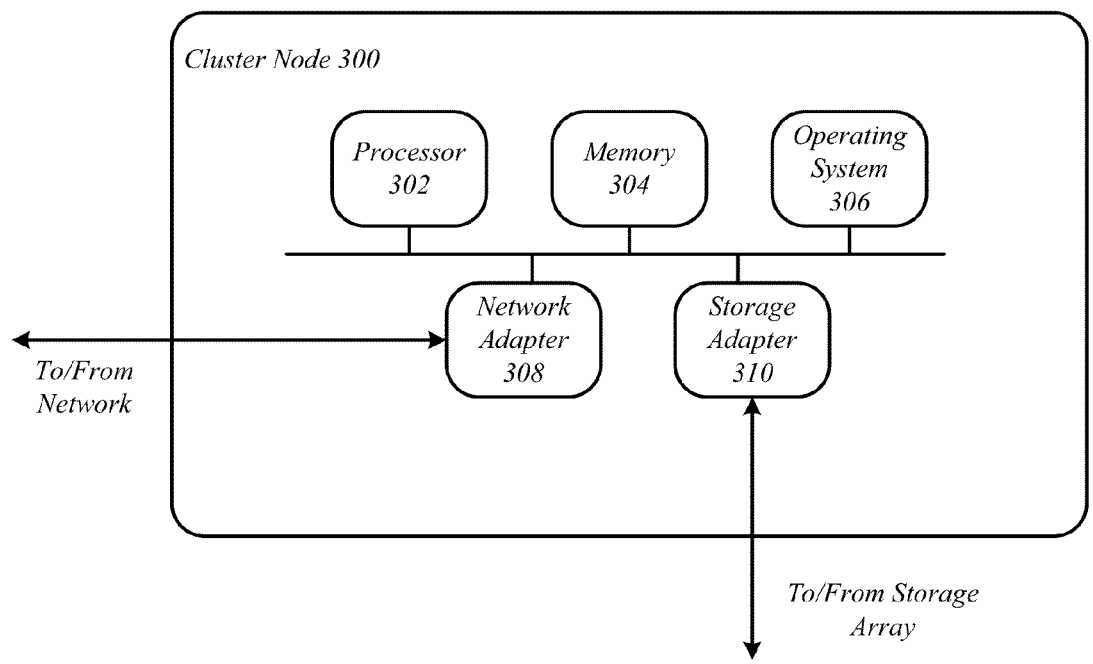
FIG. 3 illustrates an exemplary embodiment of hardware architecture of a cluster node.

FIG. 3 illustrates an exemplary embodiment of hardware architecture of a cluster node 300. In some embodiments, cluster node 300 may be the same or similar as one of the cluster nodes 204 included in the storage system 206. Cluster node 300 may include processor 302, memory 304, storage operating system 306, network adapter 308 and storage adapter 310. In various embodiments, the components of cluster node 300 may communicate with each other via one or more interconnects, such as one or more traces, buses and/or control lines.

Processor 302 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In various embodiments, cluster node 300 may include more than one processor.

In one embodiment, cluster node 300 may include a memory unit 304 to couple to processor 302. Memory unit 304 may be coupled to processor 302 via an interconnect, or by a dedicated communications bus between processor 302 and memory unit 304, which may vary as desired for a given implementation. Memory unit 304 may be implemented using any machine-readable or computer-readable media capable of storing data, including both volatile and non-volatile memory. In some embodiments, the machine-readable or computer-readable medium may include a non-transitory computer-readable storage medium, for example. The embodiments are not limited in this context.

The memory unit 304 may store data momentarily, temporarily, or permanently. The memory unit 304 may store instructions and data for cluster node 300. The memory unit 304 may also store temporary variables or other intermediate information while the processor 302 is executing instructions. The memory unit 304 is not limited to storing the above discussed data; the memory unit 304 may store any type of data. In various embodiments, memory 304 may store or include storage operating system 306

In various embodiments, cluster node 300 may include storage operating system 306 to control storage operations on the cluster node 300. In some embodiments, storage operating system 306 may be stored in memory 304 or any other type of storage device, unit, medium, and so forth. As will become more apparent with respect to FIG. 3, the storage operating system 306 may implement a write-anywhere file system that cooperates with virtualization modules to "virtualize" the storage space provided on the storage arrays and storage devices. The file system may logically organize the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of logical data blocks on the disks that are exported as logical unit numbers (LUNs).

The network adapter 308 may include the mechanical, electrical and signaling circuitry needed to connect the cluster node 300 to one or more hosts and other storage systems over a network, which may include a point-to-point connection or a shared medium, such as a local area network.

In various embodiments, the storage adapter 310 cooperates with the operating system 306 executing on the cluster node 300 to access information requested by a host device, guest device, another storage system and so forth. The information may be stored on any type of attached array of writable storage device media such as video tape, optical, DVD, magnetic tape, bubble memory, electronic random access memory, micro-electro mechanical and any other similar media adapted to store information, including data and parity information. Further, the storage adapter 310 includes input/output (I/O) interface circuitry that couples to the disks over an I/O interconnect arrangement, such as a conventional high-performance, FC serial link topology.

Figure 4:
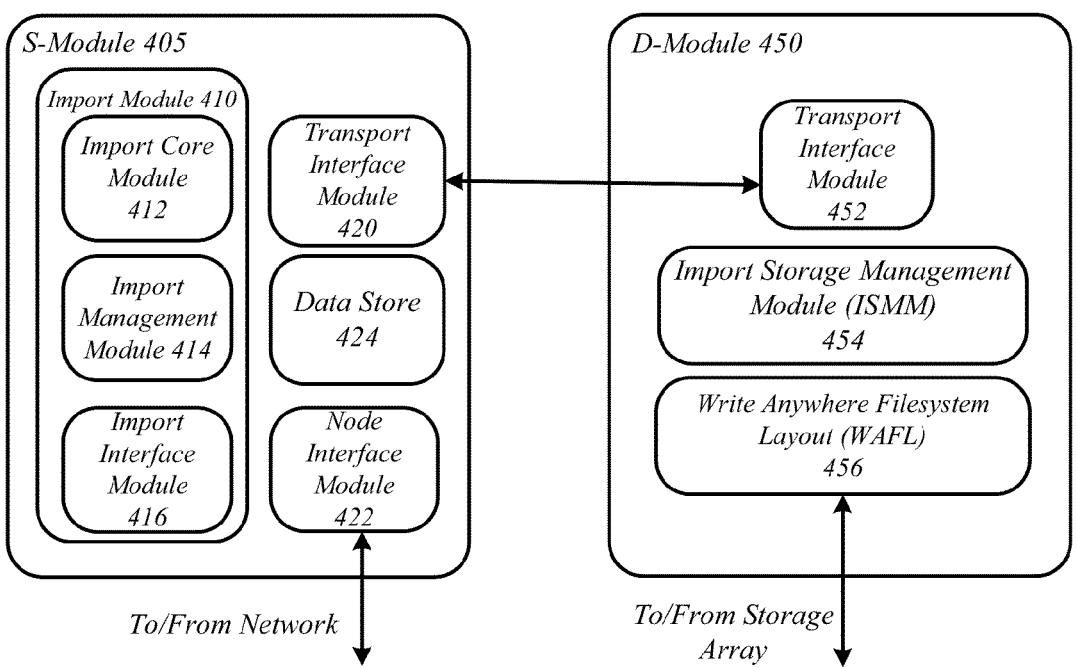
FIG. 4 illustrates an exemplary embodiment of a storage operating system architecture.

FIG. 4 illustrates an example of an operating system 400 which can be used to implement an attached clustered storage system such as the storage systems and operating system shown in FIGS. 1A, 1B, 2 and 3. In various embodiments, operating system 400 may include components, modules, functional segments, and so forth to provide read and write capabilities to a host device and other storage systems. In addition, operating system 400 may also provide importation capabilities from a source storage system to a target storage system. In this exemplary embodiment, the operating system 400 is implemented in and discussed from the perspective of the target storage system. More specifically, operating system 400 may be implemented on one or more cluster nodes of the storage system receiving the information for importation, e.g. a target storage system. However, various embodiments are not limited in this manner and the operating system 400 may be implemented on any controller, computing system, computing device, processing device, storage system and so forth. Furthermore and as will be discussed in more detail below, one or more of the components of operating system 400 may have an instance or be implemented on every cluster node in a storage system. However other components may only have instances on particular cluster nodes, such as the cluster node bounded with the source storage system's source logical unit (source logical unit) and target storage system's logical unit (target logical unit).

In the illustrated embodiment the storage operating system implements a SCSI module (S-module 405), and a data module (D-module 450). The S-module 405 and D-module 450 may be implemented on the same cluster nodes, controllers or computing devices. The functional components in combination with underlying processing hardware form the S-module 405 and D-module 450. While described as function components or modules of the S-module and D-module herein, the functional components or modules can be logically located essentially any place in the storage operating system.

The S-module 405 and D-module 450 may include multiple functional components that provide a data path for a host to access information stored in a logical unit using block access protocols, such as iSCSI, FCP, or FCoE. In addition, the S-module 405 and D-module 450 may include functional components or modules to import information from a source storage system and source logical unit to a target storage system and target logical unit. Finally, the S-module 405 and D-module 450 may provide takeover and giveback capabilities in the high availability cluster node environment.

In some embodiments, the S-module 405 may process host device read and write requests, mirroring of the write input/outputs from a host device to the source storage system during an importation operation, and checkpointing to provide restart after failure capabilities during an importation operation. In addition, components of the S-module 405 may control various takeover and giveback functionality during a takeover or giveback event. These and other details will become more apparent in the description below.

The functional components in the S-module 405 include an import module 410, a transport interface module 420 and a node interface module 422. In various embodiments, the import module 410 may include an import core module 412, an import management module 414 and an import interface module 416.

In various embodiments, the import module 410 may enable and control different aspect of the storage system before, during and after the importation of information from the source storage system to the target storage system including during a takeover or giveback event. The source storage system may include a source logical unit and may be the storage system having information for importation and the target storage system may have a target logical unit and may be the storage system to receive the information from the source storage system.

In some embodiments, the import module 410 may include an import core module 412 to handle input/output requests from a host device or guest device while information is being imported from a source storage system to the target storage system. Further, the import core module 412 may also handle processing during a takeover or giveback events while importing information from the source storage system to the target storage system.

With respect to handling the input/output requests from a host device, the import core module 412 operating on the cluster node bound to the source logical unit handles the read, write and abort requests when the source storage system and target system are bound for importation of information. More specifically, the import core module 412 may read information from the source logical unit, and write information to both the source logical unit and the target logical unit based on requests received from a host device. The import core module 412 may send information retrieved from the source logical unit based on the read request to the host device, and notify the host device if the read request was successfully completed or not successfully completed.

The import core module 412 may also mirror all write requests to both the source logical unit and target logical unit when information is being imported from the source logical to the target logical. More specifically, the import core module 412 may write information to both the source logical unit and the target logical unit on a block-by-block basis, chunk basis, and so forth. In some embodiments, the import core module 412 may first write the information to the source logical unit before writing the information to the target logical unit. Upon completion, the import core module 412 may notify the host device whether the write request was successfully completed or not.

The import core module 412 may also handle various processing during a takeover or giveback event. More specifically, the import core module 412 operating on the cluster node taking over control from another cluster may receive an event notification that a takeover event is occurring from the import storage management module 454, as will be discussed in more detail below. In addition, the import core module 412 operating on the cluster node giving back control to another cluster node may receive an event notification that a giveback event is occurring from the import storage management module 454.

In response to receiving an event notification that a takeover event or a giveback event is occurring, the import core module 412 may suspend or stop all importation processes importing information from the source logical unit to the target logical unit. Further, the import core module 412 on the cluster node taking control of processing may initialize and bind any logical units bound to the cluster node losing control to the cluster node gaining control. For example, if the source logical unit and/or the target logical unit is bound to the cluster node losing the control, the import core module 412 may bind one or both of the logical units to the cluster node taking control.

In addition, the import core module 412 on the cluster node taking control may also update any configuration and relationship information in a configuration data store, such as configuration data store 424 and then restart the importation process from the source logical unit to the target logical. The importation process may be restarted from the last checkpoint saved in the target logical unit.

The import module 410 may also include an import management module 414 to provide import operations between the source storage system and the target storage system, and in particular, the source logical unit and the target logical unit. The import management module 414 may process a full logical unit copy or importation from the source logical unit to the target logical unit by reading every block of the source logical unit and writing every block to the target logical unit.

In some embodiments, the import management module 414 may divide the source logical unit into a set of extents that may further be divided into a set of regions. By dividing the source logical unit into regions, an importation operation may be restarted in the event of node failure or reboot by utilizing checkpointing. Once the information is divided into regions, the information may be copied or imported on a region-by-region basis. For the given region being imported, the information is read from the source logical unit and written to the target logical unit. In some embodiments, the information may be read in units of 64 kilobytes (KB) chunks within the region because the write anywhere file system (WAFL) may only allow 64 KB chunk writes at a time. However, various embodiments are not limited in this manner and the WAFL system may allow other size chunk writes at a time.

Once an entire extent is copied to the target logical unit, a checkpoint is persisted on the target storage system in the configuration data store to keep track of the current point in the importation process. The persistent checkpoint allows the importation process to restart from the last known successful extent import point in the case of a failure or a restart of the importation process. A failure event may occur when a cluster node is restarted or rebooted, a takeover or giveback event occurs, on when a volume for the target storage system goes offline, for example.

During the importation process, the import management module 414 may also monitor host write requests and determine if the write request is to the same logical block(s) currently being read from the source logical unit for importation. In this case, the import management module 414 may queue the importation read request until the host devices write request is completed and the information is written to the source logical unit. The import management module 414 may then read the information from the source logical unit at the logical blocks written to by the host device and import the information to target logical unit.

In a cluster node system, only one instance of the import management module 414 on one of the cluster nodes may operate at one time. More specifically, an instance of the import management module 414 may operate on the cluster node bound with the source logical unit to control the importation of information from the source logical unit to the target logical unit. However in some embodiments, the import management module 414 may be operating any of the cluster nodes in a cluster node system.

The import module 410 may also include an import interface module 416 to provide an interface and manage read and write requests between the components of the S-module 405 and the D-module 450. For example, the import interface module 416 may receive host read and write requests from the import core module 412 and map the request to the appropriate logical unit to complete the request. In another example, the import interface module 416 may receive read and write requests from the import management module 414 for the importation of information from the source logical unit to the target logical. The import interface module 416 may then map the request to the appropriate logical unit to complete request.

Further the import interface module 416 may maintain and update information to perform file operations with the source logical unit and the target logical unit. For example, the import interface module 416 may manage and control information such as the location of the cluster node and D-module bound to the source logical unit and the target logical unit such that any read and write requests are forwarded to the correct logical unit during the importation of information.

In addition, the import core module 412 may then use the destination D-module identification for handling host read and write requests and the import management module 414 may use the destination D-module identification for handling import read and write requests. The destination D-module identification may be maintained in configuration data store 424 along with other configuration information.

In various embodiments, the import interface module 416 may receive read and write requests from the import core module 412 and the import management module 414 and direct the requests to the appropriate logical unit to be executed. For example, the import interface module 416 may receive a read request to read a source logical unit and the import interface module 416 may map the request to the correct source logical unit based on the D-module identification. In another example, the import interface module 416 may receive a write request to write information to a source logical unit and the import interface module 416 may map the write request to the correct source logical unit based on the D-module identification.

In another example, the import interface module 416 may receive read request to read information from the target logical unit and the import interface module 416 may send the read request to the write anywhere file system layout (WAFL)

module 456 to read the information from the target logical unit. In a fourth example, the import interface module 416 may receive a write request to write information to the target logical unit and the import interface module 416 may send the write request to the WAFL module 456 to write information to the target logical unit.

In some embodiments, S-module 405 may have a transport interface module 420 which may include one or more communication components to enable communication of commands and data among the modules of storage system, such as to and from the D-module 450. More specifically, the transport interface module 420 may enable communication of information or data with the D-module 450, such as functional calls, information or data blocks, or other types of communication messages.

The node interface module 422 may include one or more functional components to provide various communication capabilities to interface with a host device and a source storage system. For example, the node interface module 422 may include components to enable communication over one or more of an Ethernet network or a Fibre Channel (FC) network. In addition, the node interface module 422 may enable exchanging blocks, or discrete frames or packets of data according various communication protocols. In some embodiments, the node interface module 422 may include one or more protocols to manage and enable communication over the FCP, iSCSI, or FCoE connections to/from the host and/or another storage system.

The S-module 405 may also include or be coupled with a configuration data store 424 to store configuration and relationship information for the computer system. The configuration data store 424 may be any file structure and maintained in one or more storages devices, such as memory 304. In some embodiments, the configuration data store 424 may communicate information between the import interface module 416 which may receive information from other components of the operating system 400. However, various embodiments are not limited in and any component of the operating system 400 may communicate with the configuration data store 424.

The information may be maintained and updated in the configuration data store 424 during importation of information, reception of read/write requests, during failover events, and so forth. Various components and modules may store and update information in the configuration data store 424, such as the D-module identification, a virtual server identification, import management identification to identify the import management module location, target logical unit identification, source logical unit identification, import home node identification, import current node identification and import state information. The configuration data store 424 is not limited to storing the above-recited information and may store other information.

As previously discussed, the storage operating system may include a D-module 450 to manage, control and communicate with one or more storage arrays and logical units. For example, the D-module 450 may bind with and communicate with a source logical unit and a target logical unit. In various embodiments, the D-module 450 may include a transport interface module 452, an import storage management module 454 and a write anywhere file system layout module 456. While these modules are shown as components of the D-module 450 in this description, they can be located logically at essentially any place in the operating system.

In various embodiments, the transport interface module 452 may be the same as or similar to transport interface module 420. More specifically, the transport interface module 420 includes one or more communication components to enable communication of commands and data among the modules of storage system, such as to and from the S-module 405. More specifically, the transport interface module 452 may enable communication of information or data with the S-module 405, such as functional calls, information or data blocks, or other types of communication and information messages.

The D-module 450 may also include an import storage management module 454 to provide the components of the operating system, such as the import module 410, import management module 414 and the import interface module 416 access to the source logical unit and target logical unit. For example, the import storage management module 454 will handle host device read request from the import core module 412 via the import interface module 416 by reading the information from the source logical unit. As previously discussed, a host device read request will always be serviced by the source logical unit during the importation operation. In another example, the import storage management module 454 may handle host device write requests from the import core module 412 via the import interface module 416 by first writing the information to the source logical unit and then to the target logical unit via the WAFL module 456.

The import storage management module 454 may also manage range locks to serialize host device write request with importation write request. A range lock may limit a host device from accessing a particular region of information while the information is being imported. In some embodiments, the import storage management module 454 may receive a request for a range lock from the import management module 414 for the region of information for importation from the source logical unit to the target logical unit. The import storage management module 454 will hold a range lock, when there are outstanding host device write requests in the region for importation and will release the range lock upon the completion of the host device write requests on both the source logical unit and the target logical unit.

In various embodiments, the import storage management module 454 may also manage high availability notifications from a high availability (HA) subsystem (not shown) and may also handle takeover and giveback events. When a takeover or giveback event occurs, the import storage management module 454 may receive information from the HA subsystem that the event is occurring and notify the appropriate modules of the operating system 400, such as the import core module 412. The import core module 412 may initialize or start the takeover or giveback process. For example, in response to receiving the notification of the event the import core module 412 may stop any in progress imports and initialize the takeover or giveback event.

As will be discussed in more detail below, the import storage management module 454 may be initiated and operate on the cluster node where the source logical unit resides or is bound to. More specifically, the cluster node where the source logical unit resides may be identified as the "current home node," and the import storage management module 454 will run on the cluster node identified as the "current home node" such that the import storage management module 454 may serialize the host device write request with importation write request for the source logical unit and the target logical unit.

In some embodiments, the D-module 450 may also include a write anywhere file system layout (WAFL) module 456 to communicate with a storage array, one or more disks, one or more storage devices and so forth including the target logical unit. The WAFL module 456 may manage the layout of information on storage array, disks, storage devices, etc. and serves read and write requests to the target logical unit from the host device and the source storage system. In some embodiments, the WAFL module 456 may receive and service read and write requests to the target logical unit from the import interface module 416. The WAFL module 456 may include storage access protocols such as Small Computer System Interface (SCSI) or FCP to communicate information to and from the storage array, disks, storage devices and so forth.

Figure 5A:
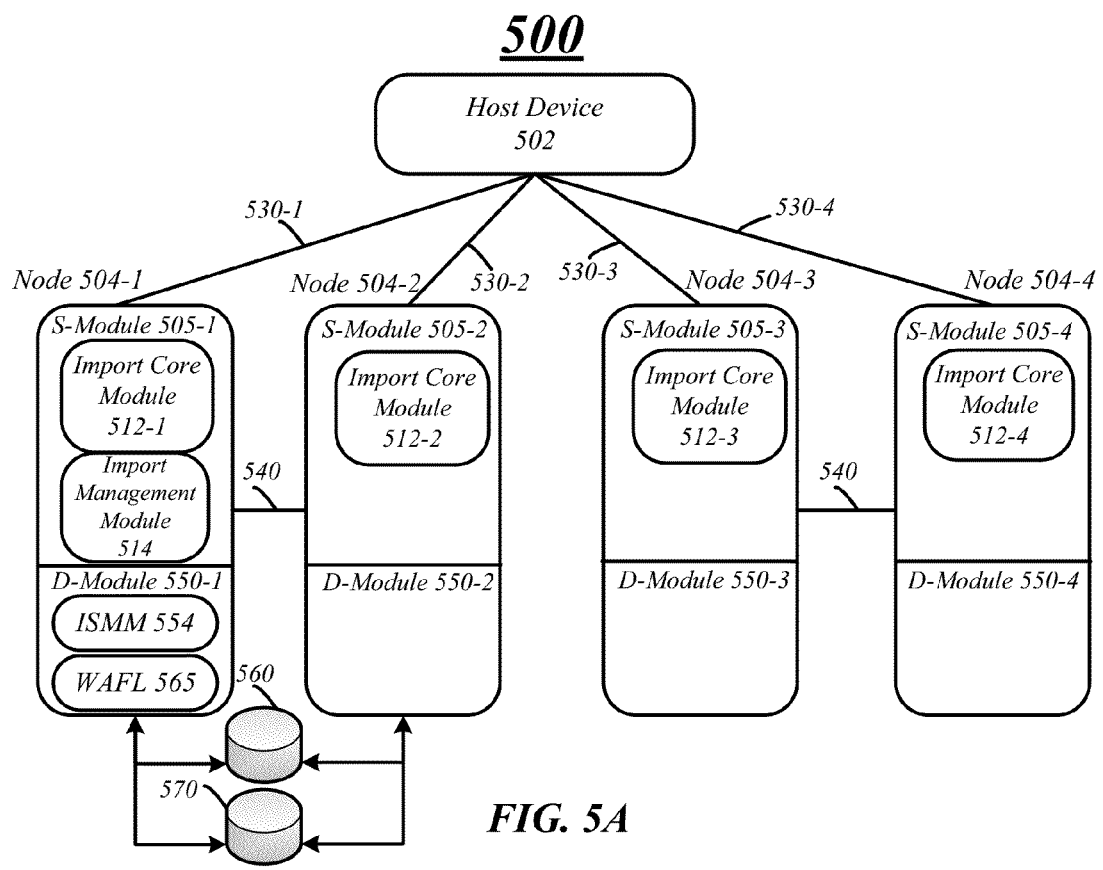
FIGS. 5A/5B illustrate exemplary embodiments of storage computing system bound to a source logical unit and a target logical unit.

FIGS. 5A/5B illustrate exemplary embodiments of storage systems in a SAN environment for conducting importation operations from a source storage system and source logical unit to a target storage system and target logical unit. FIG. 5A illustrates one such configuration where the source logical unit 560 and the target logical unit 570 are co-located or bound to the same cluster node.

FIG. 5A includes a host device 502 which may be the same or similar as host devices 102 and 202, interconnects 530-1 through 530-4 connecting the host device 502 to cluster nodes 504-1 through 504-4, respectively. In various embodiments, cluster nodes 504 may be the same as or similar to cluster nodes 204 and cluster node 300 and may implement one or more of the components or modules of storage operating system 400.

In some embodiments, the cluster nodes 504-1 through 504-4 may form clustered pairs to provide failover, takeover, and giveback functionality. More specifically, in FIG. 5A cluster nodes 504-1 and 504-2 are paired as high availability pairs and cluster nodes 504-3 and 504-4 are paired as high availability pairs. In various embodiments, each of the cluster nodes 504-1 through 504-4 may serve information independently of its paired node during normal operation. However, in the event of individual cluster node 504 failures, one or more processes for transferring and importing data may be transferred from the failed cluster node to the surviving paired cluster node over interconnects 540. The high availability pair configuration can protect against hardware failures, including network interface cards and shelf input/output module failures.

FIG. 5A illustrates clusters nodes 504 having S-modules 505 and D-modules 550 and each of the cluster nodes 504 may include an instance of an import core module 512. In addition, the cluster node 504-1 bound to the source logical unit 560 may include an instance of the import management module 514 and the import storage management module 554 and the cluster node 504-1 bound to the target logical unit 570 may include an instance of the WAFL module 565. Any cluster node 504 bound to the source logical unit 560 will have an instance of the import management module 514 and the import storage management module 554 operating on it. Further, any cluster node 504 bound to the target logical unit 570 will have an instance of the WAFL module 565 operating on it.

When the source logical unit 560 and the target logical unit 570 are co-located and bound to the same cluster node 504 the path cost between the S-module 505 and the D-module 550 are low and the asymmetric logical unit access (ALUA) may be reported to the host device 502 as active optimized. More specifically, the cluster node 504-1 may report interconnect 530-1 as active optimized and all the other interconnects may be reported as active non-optimized. The host device 502 may use this information to communicate information to the storage system. For example, the host device 502 may direct read and write requests to cluster node 504-1 over interconnect 530-1.

Figure 5B:
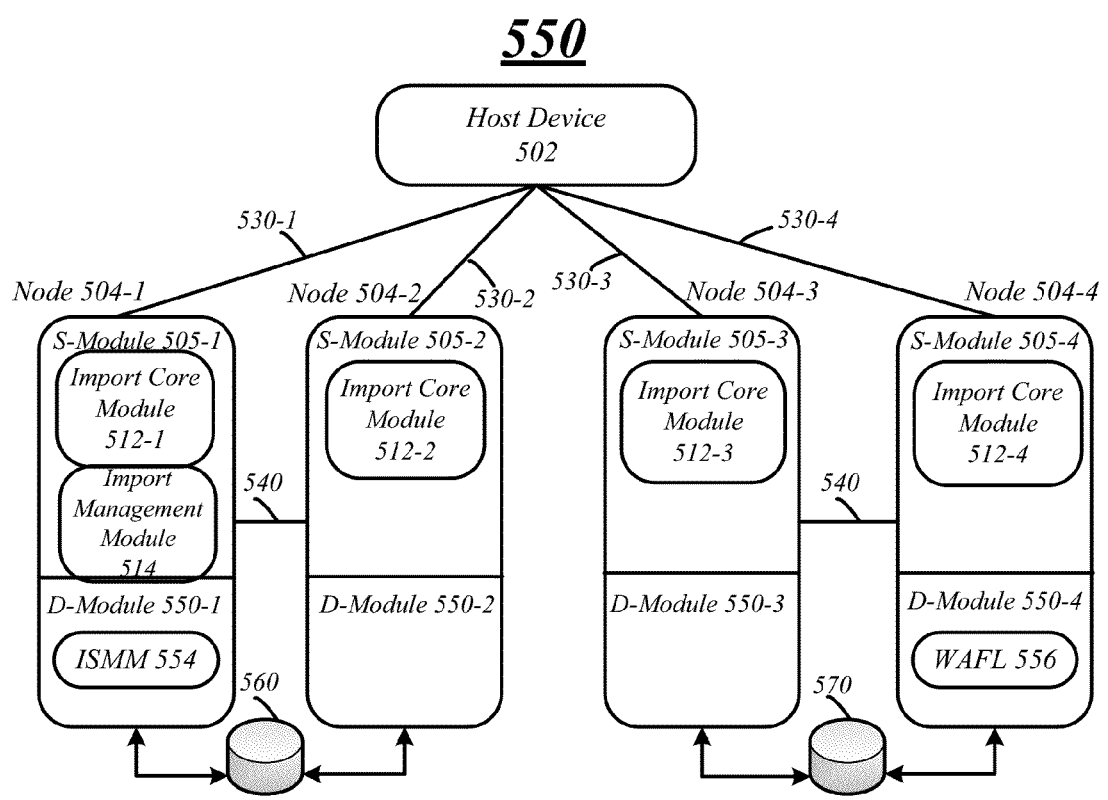

FIG. 5B illustrates another exemplary embodiment of a storage computing system 525 where the source logical unit 560 and the target logical unit 570 are not co-located. In this exemplary embodiment, the source logical unit 560 is bound to cluster node 504-1 and the target cluster node 570 is bound to cluster node 504-4. As previously discussed, the import management module 514 and import storage management module 554 will be initiated and operate on the cluster node bounded to the source logical unit 560. In this example, the import management module 514 and the import storage management module 554 are initiated and operate on cluster node 504-1. In addition, the WAFL module 556 is initiated and operates on the cluster node bound to the target logical unit 570. In this example, the WAFL module 556 is initiated and operates on cluster node 504-4.

When the source logical unit 560 and the target logical unit 570 are not co-located the path costs to the cluster node bounded to the target logical unit 570 are low and AULA is reported as active optimized to the host device 502. Thus, in this embodiment, interconnect 530-4 would be identified as active optimized. All other paths including 530-1 through 530-3 would be identified as active non-optimized. In some instances, there may be a performance impact in this configuration because reads and writes between the host device 502, the source logical unit 560 and the target logical unit 570 will have to traverse additional cluster interconnects.

Figure 6A:
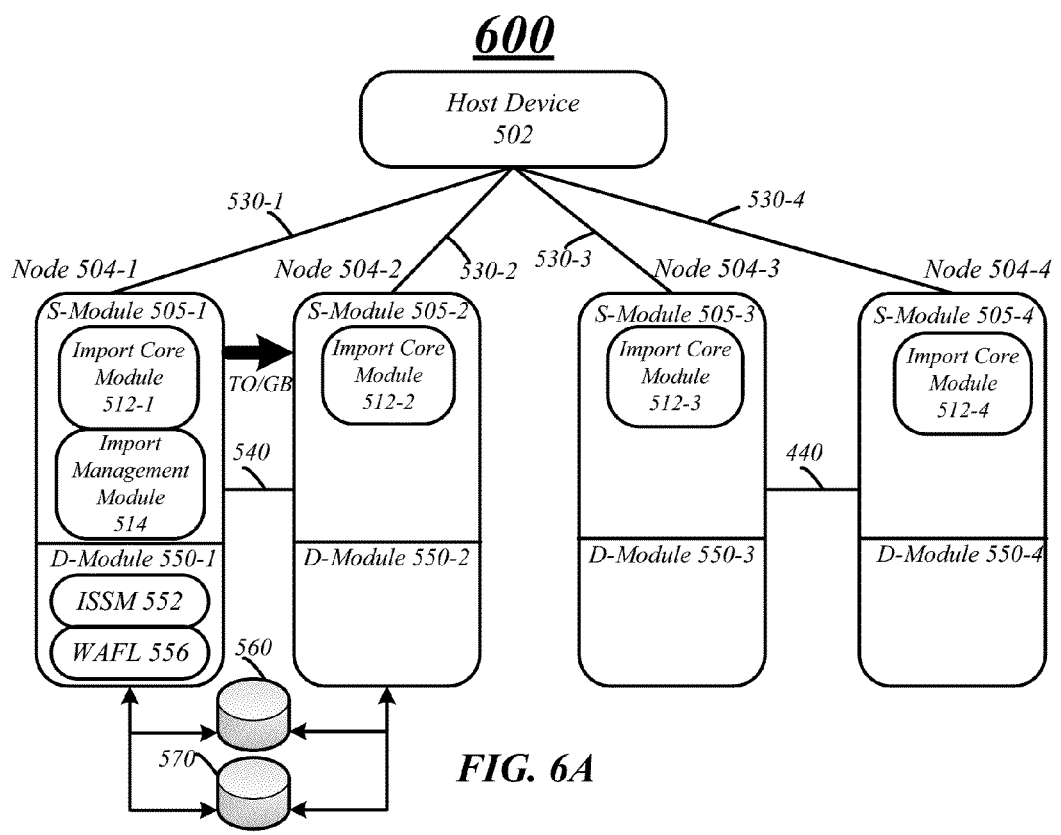
FIGS. 6A-C illustrate exemplary embodiments of a bounded storage computing system during takeover and giveback events.

FIGS. 6A/6B/6C illustrate exemplary embodiments of storage computing systems of various importation configurations when a takeover or giveback event occurs. Computing systems 600, 625 and 650 may be the same as or similar to computing system 500 and 525 of FIGS. 5A and 5B.

FIG. 6A illustrates a storage computing system 600 having both the source logical unit 560 and target logical unit 570 co-located and bounded to cluster node 504-1. In this exemplary embodiment, a takeover or giveback event may occur causing cluster node 504-2 to take control of the importation operation and be bounded to both the source logical unit 560 and the target logical 570.

As previously discussed, the import storage management module 552 may receive information that an event has occurred, such as a takeover event or a giveback event. In some embodiments, the importation of information from the source logical unit 560 to the target logical unit 570 may fail until the event is completed. The import storage management module 552 may notify the import core modules 512 of the event and appropriate actions will be taken to complete the event. For example, import core module 512 may stop all importation of information until the event is completed.

When a takeover event occurs such as when one cluster node takes over importation and read/write processing from another cluster node because of a failure, the import core module 512 on the cluster node 504 taking over the processing may initialize the logical units on the new cluster node 504. For example, in FIG. 6A import core module 512-2 may initialize and bind the source logical unit 560 and the target logical unit 570 to the new cluster node 504-2. In addition, the import core module 512-2 may update all the appropriate information in the configuration data store to properly configure the storage computing system. For example, the import core module 512-2 may update the D-module identification with the new D-module 550-2 and the virtual server identification, and import current node identification to identify the new cluster node 504-2.

Further, during the takeover event, the import core module 512-2 may also initialize and operate import processing including the import management module 514, the import storage management module 552 and the WAFL module 556 on the new cluster node 504-2. The import core module 512-2 may also update information in the configuration data store to reflect these changes as well. For example, the import management identification may be updated to identify the import management module location on cluster node 504-2.

Once all the import processes including the import management module 514, the import storage management module 552 and the WAFL module 556 are initiated and operating on the new cluster node 504-2, the import core module 512-2 may restart the importation process to import information. In addition, the importation process may restart importing data from the last known checkpoint. As previously discussed, after each extent is imported to the target logical unit, checkpoint information is stored in the last few logical blocks of the target logical unit. Thus, the import management module 514 may continue the importation process from the last full extent copied to the target logical unit based on the checkpoint information and does not have to restart the importation of information from the beginning.

In addition, the takeover process will occur seamlessly and transparently to the host device 502. More specifically, the host device's 502 read and write request will be queued until the new cluster node 504-2 completely takes over processing and the requests will be properly handle because the appropriate relationship and configuration information is updated in the configuration data store.

In the case of a giveback event where one cluster node 504 gives back control of the read/write request and importation processing to another cluster node 504, the handover may be similar to a takeover event. For example and with respect to FIG. 6A, the import storage management module 552 may receive information from the HA subsystem indicating a giveback event is to occur on. The import storage management module 552 may notify the import core module 512 on the cluster node 504 giving back control to another node, import core module 512-1 on cluster node 504-1 in this example, of the give back event. The import core module 512-1 may stop all importation processing until the giveback event is successfully completed. The import core module 512 receiving control may bind the logical units to the new cluster node, initialize processes on the new cluster node, and update the configuration information in the configuration data store. With respect to FIG. 6A, import core module 512-2 may bind logical units 560 and 570 to cluster node 504-2. The import core module 512-2 may also initialize and operate the import management module 514, import storage management module 552 and the WAFL module 556 on cluster node 504-2. In addition, configuration and relationship information may be updated in the configuration data store by the import core module 512-2. For example, the import core module 512-2 may update the D-module identification with the new D-module 550-2 and the virtual server identification, and import current node identification to identify the new cluster node 504-2.

Once all the import processes including the import management module 514, the import storage management module 552 and the WAFL module 556 are initiated and operating on the new cluster node 504-2, the import core module 512-2 may restart the importation process to import information. In addition, the importation process may restart importing data from the last known checkpoint, as previously discussed.

Figure 6B:
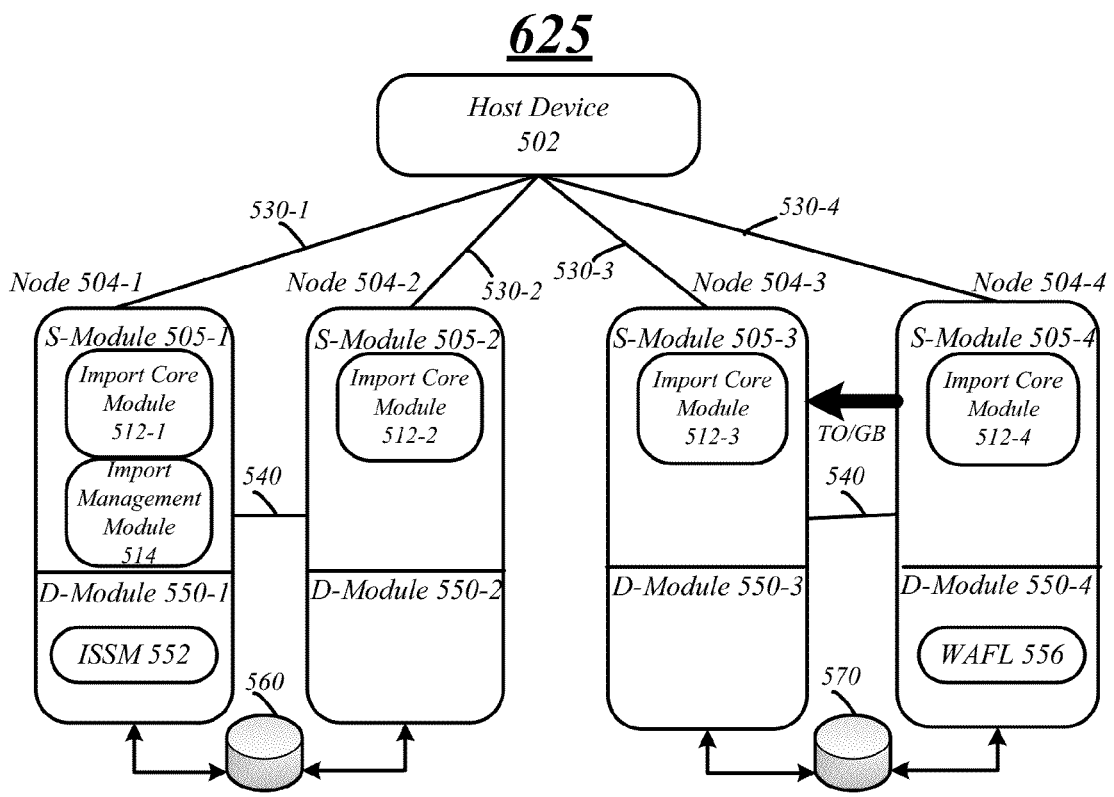

FIG. 6B illustrates another exemplary embodiment of a storage system 625 when a takeover/giveback event occurs when the logical units are not co-located. In this exemplary embodiment, the cluster node 504-4 bound to the target logical unit 570 loses control to cluster node 504-3 either via a takeover or a giveback event. As similarly discussed above with respect to FIG. 6A, the import storage management module 552 may receive an indication that a takeover or giveback event is occurring on cluster node pairs 504-3 and 504-4 via the HA subsystem. If the event is a takeover event, the import management module 552 may notify the import core module 512 operating on the cluster node 504 taking over control of the event. In this exemplary embodiment, import core module 512-3 on cluster node 504-3 will receive an event notification from the import management module 552 of the takeover event. If the event is a giveback event, the import management module 512 on the cluster node 504 giving back control will receive the event notification. In this exemplary embodiments, import module 512-4 on cluster node 504-4 will receive the event notification for a giveback event.

In either case, the import core module 512 receiving the event notification will stop all importation and read/write request processing until the event has completed. In addition, the import core module 512 receiving or taking control of the import may bind the target logical unit 570 to the new cluster node, initialize processes on the new cluster node, and update the configuration information in the configuration data store. With respect to FIG. 6B, import core module 512-3 may bind the target logical unit 570 to cluster node 504-3. The import core module 512-3 may also initialize and operate the WAFL module 556 on cluster node 504-3. However, the import management module 514 and the import storage management module 552 will remain operating on the node bound to the source logical unit 560, cluster node 504-1. In this example, the configuration and relationship information may be updated in the configuration data store by the import core module 512-3.

Once all the import processes including the import management module 514, the import storage management module 552 and the WAFL module 556 are initiated and operating, the import core module 512-3 may restart the importation process to import information. In addition, the importation process may restart importing data from the last known checkpoint, as previously discussed.

Figure 6C:
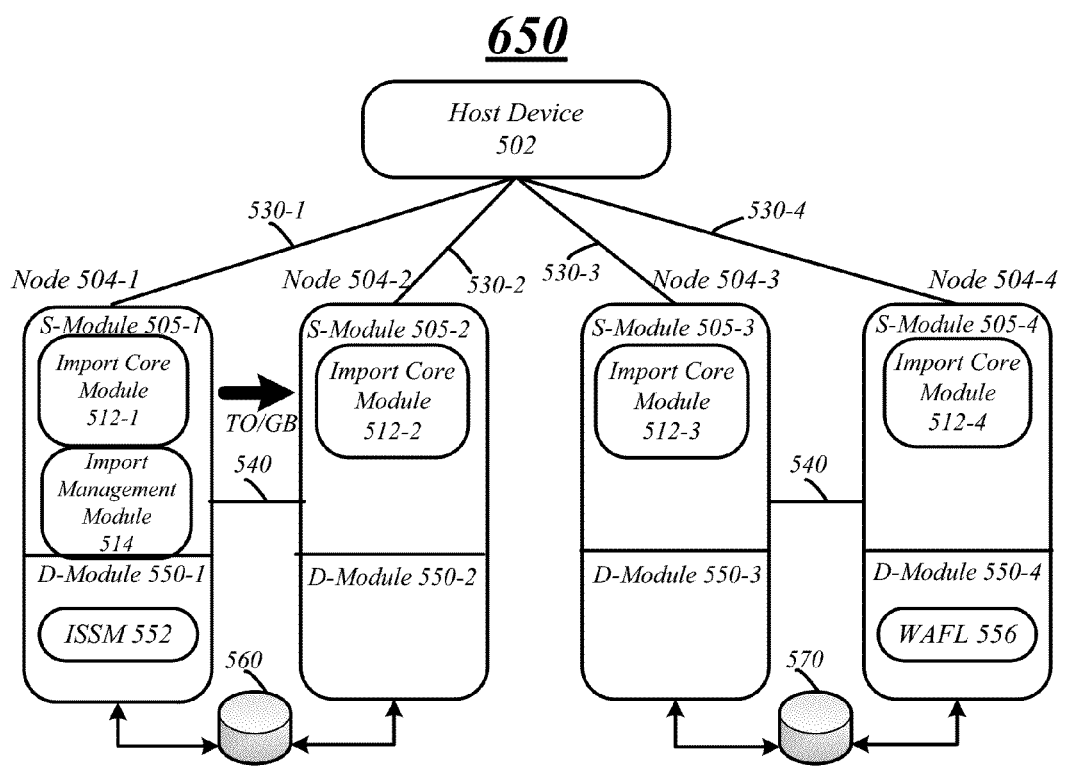

FIG. 6C illustrates another exemplary embodiment of a storage system 650 when a takeover/giveback event occurs when the logical units are not co-located. In this exemplary embodiment, the cluster node 504-1 bound to the source logical unit 560 loses control to cluster node 504-2 either via a takeover or a giveback event. As discussed above with respect to FIGS. 6A and 6B, the import storage management module 552 may receive an indication that a takeover or giveback event is occurring on cluster node pairs 504-1 and 504-2 via the HA subsystem. If the event is a takeover event, the import management module 552 may notify the import core module 512 operating on the cluster node 504 taking over control of the event. In this exemplary embodiment, import core module 512-2 on cluster node 504-2 will receive an event notification from the import management module 552 of the takeover event. If the event is a giveback event, the import management module 512 on the cluster node 504 giving back control will receive the event notification. In this exemplary embodiments, import module 512-1 on cluster node 504-1 will receive the event notification.

In either case, the import core module 512 receiving the notification may stop all importation and read/write request processing until the event has completed. In addition, the import core module 512 taking control import may bind the source logical unit 560 to the new cluster node, initialize processes on the new cluster node, and update the configuration information in the configuration data store. With respect to FIG. 6C, import core module 512-2 may bind the target logical unit 560 to cluster node 504-2. The import core module 512-2 may also initialize and operate the import management module 514 and import storage management module 552 on cluster node 504-2. However, the WAFL module 556 will remain to operate on the node bound to the target logical unit 570, cluster node 504-4. In this example, the configuration and relationship information may be updated in the configuration data store by the import core module 512-2. For example, the import core module 512-2 may update the D-module identification with the new D-module 550-2 and the virtual server identification, import home node identification and import current node identification to identify the new cluster node 504-2.

Once all the import processes including the import management module 514, the import storage management module 552 and the WAFL module 556 are initiated and operating, the import core module 512-2 may restart the importation process to import information. In addition, the importation process may restart importing data from the last known checkpoint, as previously discussed.

Figure 7:
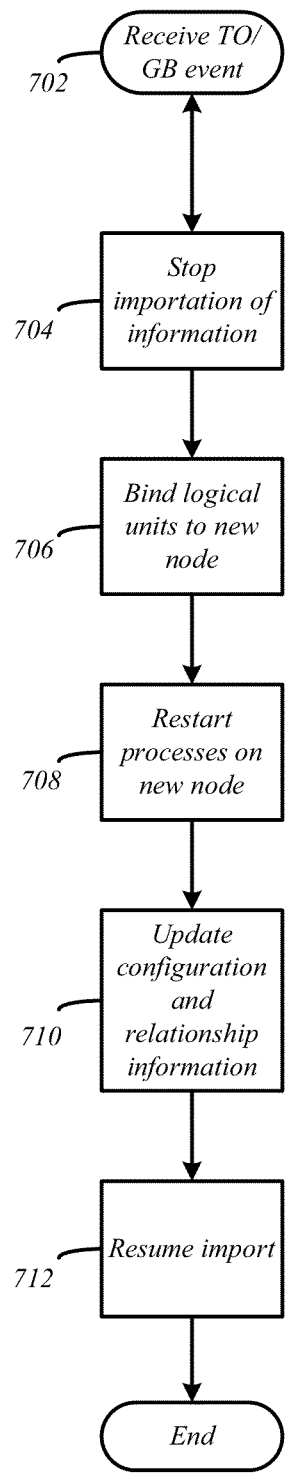
FIG. 7 illustrates an exemplary embodiment of a logic flow.

FIG. 7 illustrates one exemplary embodiment of a logic flow 700 of a storage computing system during a takeover or giveback event. Logic flow 700 may be representative of some or all of the operations executed by one or more embodiments described herein.

At block 702, information indicating a takeover or giveback event is occurring or has occurred may be received by a cluster node of a storage computing system, such as computing system 206. More specifically, one or more processes, such as an import storage management module may receive information from a high availability (HA) subsystem that a cluster node has failed, one or more interconnects have failed, or a cluster node wants to giveback control to another cluster node in the storage system. Various embodiments are not limited to these examples and the HA subsystem may detect other failures, errors, and so forth and provide information that a takeover or giveback event is occurring.

In various embodiments, a takeover or giveback event may be initialized and any importation of information may be paused or stopped until the event has completed on the storage computing system at block 704. In various embodiments, the import storage management module may notify an import core module that event is occurring and the import core module may stop the transfer of information from a source logical unit to a target logical unit. During a takeover event, the import core module on the cluster node taking over control from another node may receive the notification and stop the importation of information. However, during a giveback event, the import control module on the cluster node giving control back to another cluster node may stop importation of information.

At logical block 706, any logical units bound to the cluster node losing control may be bound to the new cluster node gaining control. More specifically, the source logical unit, the target logical unit, or both may be bound to the new cluster node if they are bound to the original cluster node losing control.

In addition, any processes operating on the cluster node losing control may be initiated and operate on the new cluster node at logical block 708. For example, the import management module, import storage management module, and WAFL module may be started on the new cluster node taking control if they were operating on the cluster node losing control. Various embodiments are not limited to these modules, any components, modules and processes may be initiated and operate on the new cluster that was operating on the cluster node losing control.

Configuration and relationship information may be updated to identify the location of the various processes, to identify the cluster node the logical units are bound to, and to identify information such that read and write requests are directed to the correct cluster node. For example, a D-module identification may be updated in a configuration data store to the current node bound to the source logical unit and the import management module. In another example, a current node identification may be updated to the current node bound to the source logical unit such that read and write requests directed to the source logical unit and the import management module. In a third example, an import management identification to identify the import management module location may be updated such that one or more processes and components may be able to locate and direct information to the import management identification module. In addition, import current node identification may be updated to indicate the cluster node where the import management identification is currently operating on. Other information may also be updated to reflect the change in cluster nodes.

At logical block 712, any importation processes may be restarted and information from the source logical unit may be copied to the target logical unit. The importation of information may restart from the last known checkpoint. As previously discussed, after each extent is imported to the target logical unit, checkpoint information is stored in the last few logical blocks of the target logical unit. Thus, the import may resume or continue from the last full extent copied to the target logical unit based on the checkpoint information and does not have to restart the importation of information from the beginning.

FIG. 8 illustrates an exemplary embodiment of logic flow 800. The logic flow 500 may be representative of some or all of the operations executed by one or more embodiments described herein. For example, the logic flow 800 may illustrate operations performed by the system 100, system 150, system 200, cluster node 300 and so forth.

In the illustrated embodiment shown in FIG. 8, the logic flow 800 may include receiving an event notification for a pair of cluster nodes having a first cluster node and a second cluster node, the event notification indicating an occurrence of a takeover event or a giveback event at block 805. In various embodiments, the event notification may be generated and based on a failure of either the first cluster node or the second cluster. However various embodiments are not limited in this manner the event notification may be based on the first cluster node or the second cluster node coming back online.

Logic flow 800 may also include suspending copying of information from a source logical unit to a target logical unit at block 810. For example, information on the source logical unit of a source cluster system may be copied or imported to the target logical unit on a target cluster system. In some embodiments, when an event occurs on a cluster node bound to either the source logical unit or the target logical unit and event notification is received, the importation or copying of information may be stopped or suspended.

Further, at block 815 the logic flow 800 may include transferring one or more processes from the first cluster node to the second cluster node. More specifically, one or more processes for transferring and importing data may be transferred from the failed cluster node to the surviving paired cluster node or back to a node coming back online. The logic flow 800 may also include resuming importation of information from the source logical unit to the target logical unit at block 820.

Figure 9:
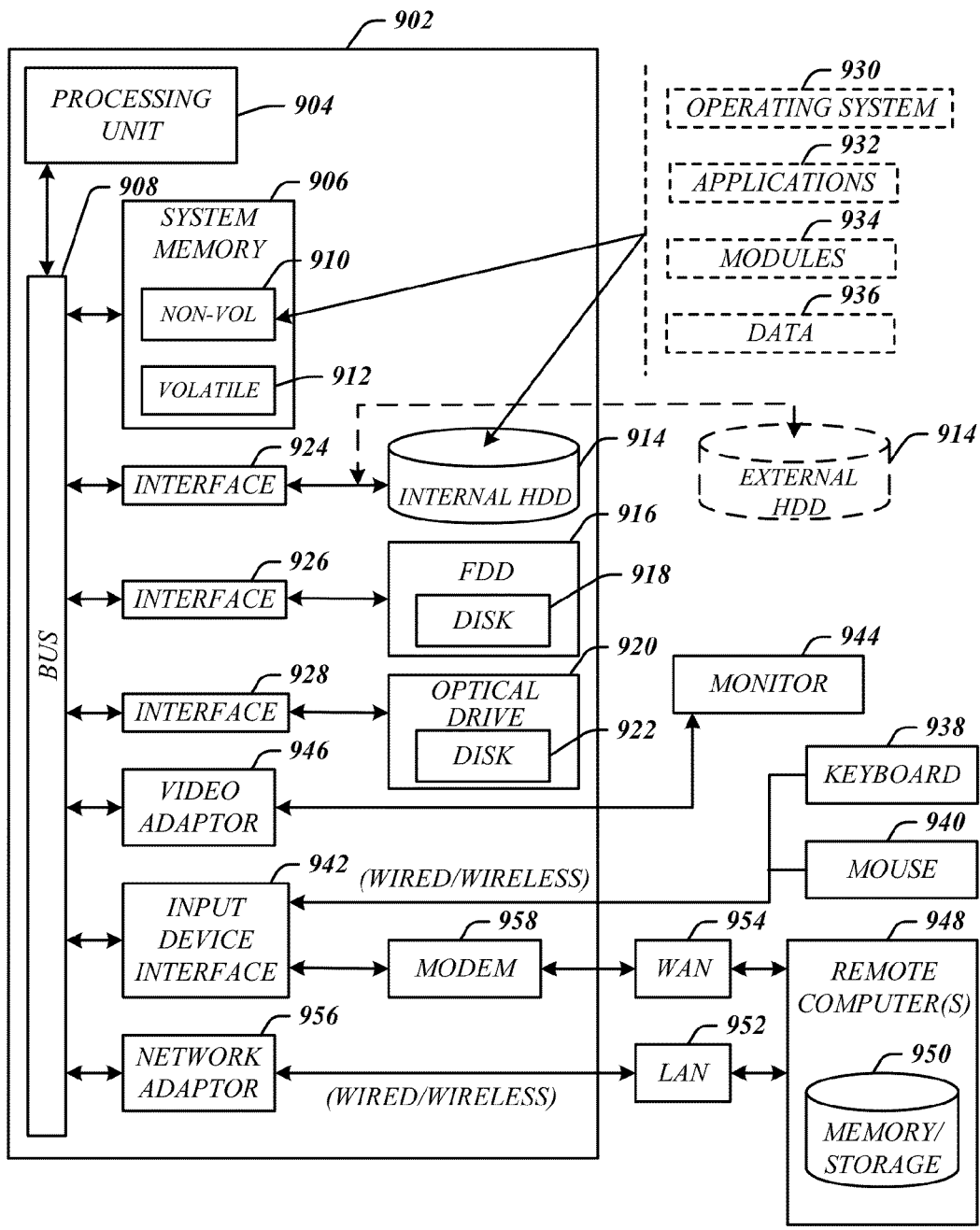
FIG. 9 illustrates an embodiment of a first computing architecture.

FIG. 9 illustrates an embodiment of an exemplary computing architecture 900 suitable for implementing various embodiments as previously described. In one embodiment, the computing architecture 900 may include or be implemented as part of computing system, such as storage systems 106, 152 and 200.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 includes a processing unit 904, a system memory 906 and a system bus 908. The processing unit 904 can be any of various commercially available processors.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 902 family of standards, such as wireless devices operatively disposed in wireless communication (e.g., IEEE 902.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 902.11x (a, b, g, n, etc.) to provide secure, reliable, fast wireless connectivity. A Wi-Fi network can be used to connect computers to each other, to the Internet, and to wire networks (which use IEEE 902.3-related media and functions).

The various elements of the storage systems 106, 152, and 200 as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
    during an ongoing copying of information from a first logical unit to a target logical unit, receiving an event notification for a pair of cluster nodes having a first cluster node and a second cluster node, the first cluster node controlling the copying of the information from the source logical unit to the target logical unit, wherein the event notification indicates an occurrence of a takeover event or a giveback event;

upon receiving the event notification, suspending the copying of the information from the source logical unit to the target logical unit;

transferring one or more processes from the first cluster node to the second cluster node, the one or more processes related to the copying of the information from the source logical unit to the target logical unit; and resuming the copying of the information from the source logical unit to the target logical unit.

2. The computer-implemented method of claim 1, comprising:

associating the source logical unit, the target logical unit or both with the second cluster node prior to resuming the copying of the information.

3. The computer-implemented method of claim 1, comprising:

updating configuration information in a configuration data store to identify the second cluster node as the current cluster node for controlling copying of the information prior to resuming copying of the information.

4. The computer-implemented method of claim 1, further comprising: updating configuration information in a configuration data store to identify the one or more processes operating on the second cluster node.

5. The computer-implemented method of claim 1, wherein the event notification indicates the occurrence of the takeover event in which the second cluster node will take over processing from the first cluster node.

6. The computer-implemented method of claim 1, wherein the event notification indicates the occurrence of the giveback event in which the first cluster node will give back processing to the second cluster node.

7. The computer-implemented method of claim 1, wherein resuming the copying comprises resuming from a checkpoint identifying a last extent imported to the target logical unit.

8. The computer-implemented method of claim 7, wherein the checkpoint is stored in a configuration data store on a target storage system.

9. An article comprising a computer-readable storage medium comprising a plurality of instructions that when executed enable processing circuitry to:

during an ongoing copying of information from a first logical unit to a target logical unit, receive an event notification for a pair of cluster nodes having a first cluster node and a second cluster node, the first cluster node controlling the ongoing copying of the information from the source logical unit to the target logical unit, wherein the event notification indicates an occurrence of a takeover event or a giveback event;

upon receiving the event notification, suspend the copying of the information from the source logical unit to the target logical unit;

transfer one or more processes from the first cluster node to the second cluster node, the one or more processes related to the copying of the information from the source logical unit to the target logical unit; and resume the copying of the information from the source logical unit to the target logical unit.

10. The storage medium of claim 9, comprising instructions that when executed enable the processing circuitry to:

associate the source logical unit, the target logical unit or both with the second cluster node prior to resuming the copying of the information.

11. The storage medium of claim 9, further comprising instructions that when executed enable the processing circuitry to:

update configuration information in memory to identify the second cluster node as the current cluster node for controlling copying of the information prior to resuming copying of the information.

12. The storage medium of claim 9, further comprising instructions that when executed enable the processing circuitry to:

update configuration information in memory to identify the one or more processes operating on the second cluster node.

13. The storage medium of claim 9, wherein the event notification indicates the occurrence of the takeover event in which the second cluster node will take over processing from the first cluster node.

14. The storage medium of claim 9, wherein the event notification indicates the occurrence of the giveback event in which the first cluster node will give back processing to the second cluster node.

15. The storage medium of claim 9, comprising instructions that when executed enable the processing circuitry to:

resume from a checkpoint identifying a last extent imported to the target logical unit.

16. The storage medium of claim 15, wherein the checkpoint is stored in a configuration data store on a target storage system.

17. An apparatus, comprising:

processing circuitry; and logic, at least a portion of which is in hardware, the logic to:

during an ongoing copying of information from a first logical unit to a target logical unit, receive an event notification for a pair of cluster nodes having a first cluster node and a second cluster node, the first cluster node controlling the ongoing copying of the information from the source logical unit to the target logical unit, wherein the event notification indicates an occurrence of a takeover event or a giveback event;

upon receiving the event notification, suspend the copying of the information from the source logical unit to the target logical unit;

transfer one or more processes from the first cluster node to the second cluster node, the one or more processes related to the copying of the information from the source logical unit to the target logical unit; and resume the copying of the information from the source logical unit to the target logical unit.

18. The apparatus of claim 17, the logic to associate the source logical unit, the target logical unit or both with the second cluster node prior to resuming the copying of the information.

19. The apparatus of claim 17, the logic to update configuration information in memory to identify the second cluster node as the current cluster node for controlling copying of the information prior to resuming copying of the information.

20. The apparatus of claim 17, the logic to update configuration information in memory to identify the one or more processes operating on the second cluster node.

21. The apparatus of claim 17, wherein the event notification indicates the occurrence of the takeover event in which the second cluster node will take over processing from the first cluster node.

22. The apparatus of claim 17, wherein the event notification indicates the occurrence of the giveback event in which the first cluster node will give back processing to the second cluster node.

23. The apparatus of claim 17, the logic to resume from a checkpoint identifying a last extent imported to the target logical unit.

24. The apparatus of claim 23, wherein the checkpoint is stored in a configuration data store on a target storage system.

* * * * *